United States Patent [19]

Skoblenick et al.

[11] Patent Number: 4,817,534

[45] Date of Patent: Apr. 4, 1989

[54] PRESENT INVENTION RELATES TO RAIL VEHICLES

[75] Inventors: Harry Skoblenick; Roy E. Smith, both of Kingston, Canada

[73] Assignee: Urban Transportation Development Corporation Limited, Toronto, Canada

[21] Appl. No.: 36,869

[22] Filed: Apr. 9, 1987

[51] Int. Cl.⁴ ............................................. B61C 15/00
[52] U.S. Cl. ..................................... 105/30; 295/36.1
[58] Field of Search ............ 295/36 R; 105/30, 199.1, 105/199.5

[56] References Cited

U.S. PATENT DOCUMENTS 2,727,780 12/1955 Long et al. ...................... 245/36 R Primary Examiner—A. Michael Chambers
Assistant Examiner—John C. Fox
Attorney, Agent, or Firm—Fleit, Jacobson, Cohn & Price

[57] ABSTRACT

A rail vehicle is disclosed to travel down a track formed from a pair of rails. The rail vehicle is propelled by a drive assembly having a longitudinal axis in line with the rails and a pair of wheel sets, each of which includes an axle with a wheel rotatably mounted on each end thereof. The drive assembly is further adapted to provide a positive angle of attack between the rotational plane of at least one wheel and the respective rail, so as to improve the stability of the vehicle. A method is also disclosed for improving the stability of a rail vehicle.

9 Claims, 3 Drawing Sheets

PRESENT INVENTION RELATES TO RAIL VEHICLES

Considerable effort has been directed at providing a cost effective transportation service for remote localities. At the same time, there has been a noticeable increase in the amount of dormant railway lines existing between remote locations due to diminishing natural resources in the particular area. Accordingly, attempts are being made to utilize these existing but now dormant rail tracks to provide a low cost transit system.

However, the cost of providing a locomotive and a few train cars along the track to these remote locations at regular intervals has been prohibitive due to the minimal ridership levels obtained and high operating costs.

One way of utilizing dormant tracks while at the same time reducing the cost of transit services to these remote localities, is to adapt highway buses for track use, involving the outfitting of the bus with train wheels.

Although providing an inexpensive alternative the rail modified bus experiences instability during its travel along the track. This is due to the effect of "hunting" inherent with train vehicles due to the unique frustro conical design of the train wheels.

The "hunting" effect poses no problems to train vehicles, since the wheels of the vehicle are fixed to their respective axles which are in turn rotatably mounted to the vehicle chassis. This rigid axle configuration utilizes the conicity of the wheels to provide stability to the train car, by accommodating differences in wheel speed between the two wheels when the train car negotiates a curve.

However, the use of the frustro conical wheels on buses produces adverse effects to the vehicle, in part due to the fact that the wheels rotate on a fixed axle, which also includes a speed differential to accommodate any differences in speed of the wheels. Thus, with the frustro conical wheels rotating freely on the axle, the bus tends to oscillate laterally on the rails.

Furthermore, this "hunting" effect causes a high rate of wear on both the rails and the wheels, thereby requiring substantial maintenance procedures and expense.

It is therefore an object of the present invention, to obviate or mitigate the above-mentioned disadvantages by providing a novel form of rail vehicle.

Accordingly to the present invention, there is provided a rail vehicle to travel along a track, said track being formed from a pair of rails with each having a wheel contacting surface defined by a central axis, said vehicle comprising a vehicle body propelled by a drive assembly, said drive assembly having a longitudinal axis in line with said rails and a pair of wheel sets, each of which includes an axle onto which is rotatably mounted a pair of wheels to contact respectively each of said wheel contacting surfaces, said drive assembly being adapted to provide a positive angle of attack between the plane of rotation of at least one wheel and the respective rail, so as to improve the stability of said vehicle.

The invention also involves a method of improving the stability of a rail vehicle having a body propelled by a drive train, including a pair of wheel sets, each of the wheel sets having an axle onto which is rotated a pair of wheels, the method including the step of offsetting the axis of at least one wheel by a predetermined incremental angle with respect to the longitudinal axis of the vehicle.

Further features, objects and advantages of the present invention will be evident following a detailed description of several embodiments, given by way of example only, as illustrated in the appended drawings, in which.

Figure 4:
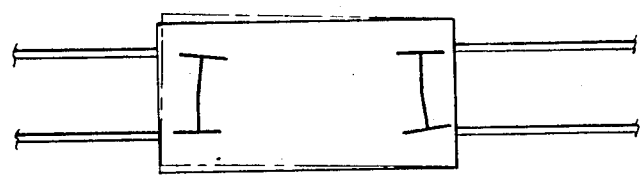
Figure 4:
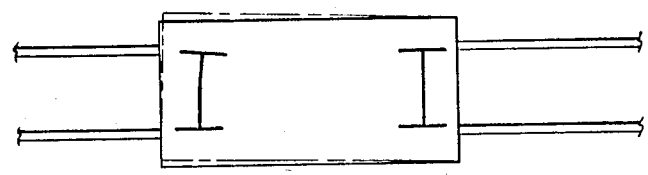
Figure 4:
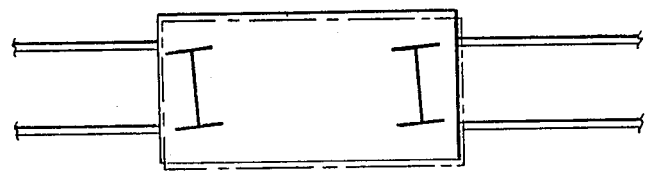
Figure 4:
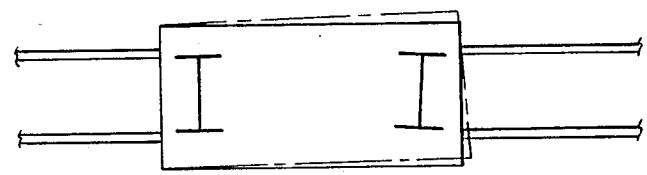
Figure 4:
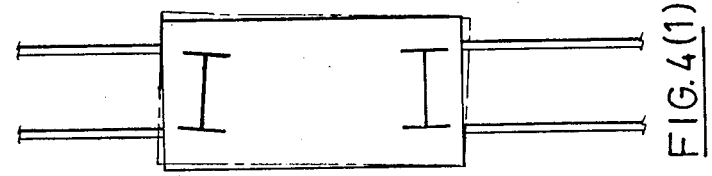

FIGS. 4(1)–4(5) are a schematic illustration of several alternative configurations of rail vehicles.

Figure 1:
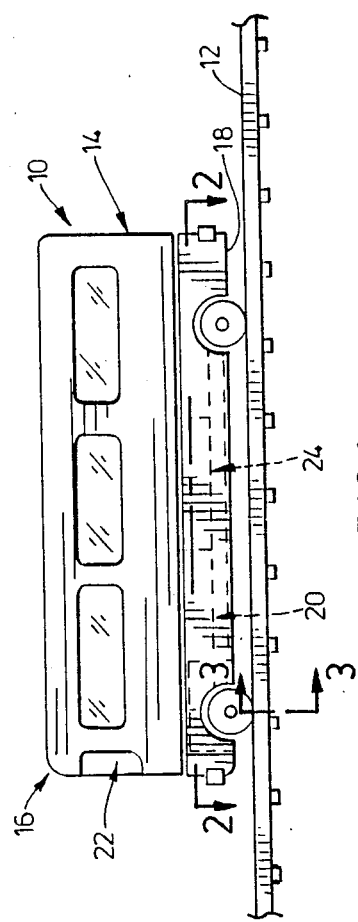
FIG. 1 is a side view of a rail vehicle.

Referring to FIG. 1, a rail vehicle 10 is shown positioned on a track comprising a pair of rails, one of which is shown at 12. The vehicle 10 is a bus having a chassis 14 supporting a superstructure 16 carrying passengers and cargo. A drive train 20 is supported on the chassis 14.

The superstructure 16 includes an operator station 22 and is rotatable on the substructure 18 by way of a turn table 24, which avoids the need for rail loops or other devices to turn the vehicle around.

Figure 2:
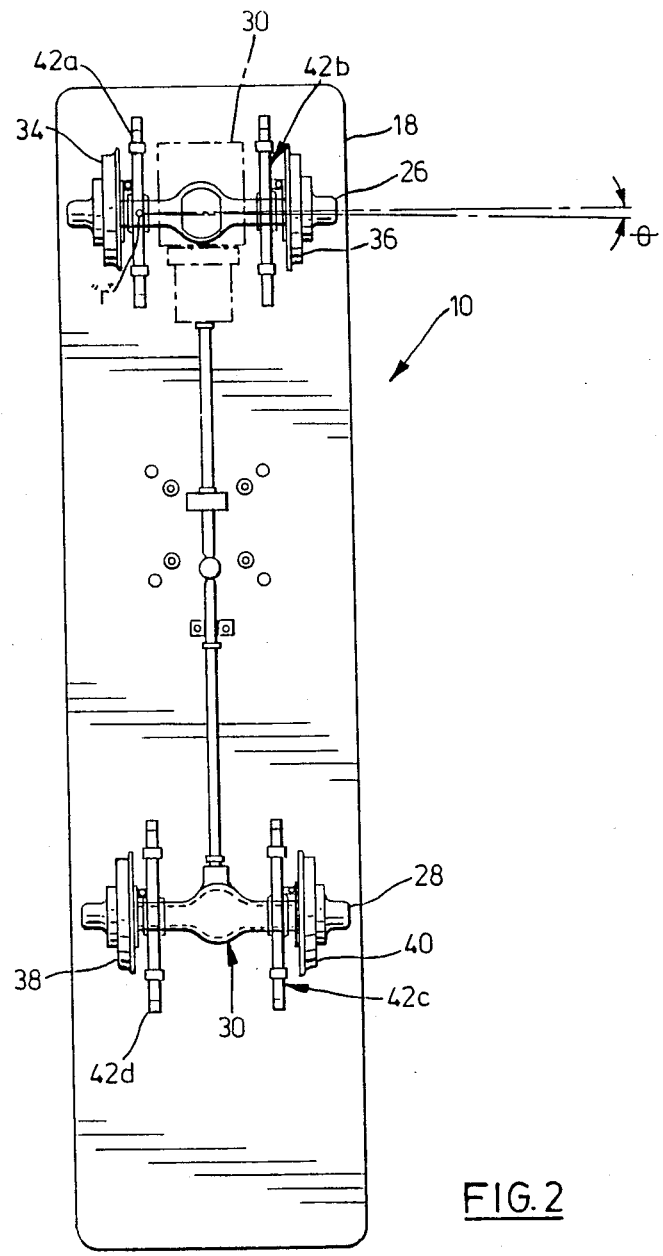
FIG. 2 is a view taken on line 2—2 of FIG. 1.

The substructure 18 of the bus 10 is shown in more detail in FIG. 2, wherein there is shown a front axle 26 and a rear axle 28, the rear axle 28 being driven by the drive train 20 which includes a differential 30, located in the rear axle 28, and a motor 32.

Rotatably mounted on the front axle 26 are left and right wheels 34, 36 respectively, while left and right wheels 38, 40 respectively are rotatably mounted on the rear axle 28. Springs $42a$ to $42d$ are also shown providing a suspension system between the wheels and the substructure 18.

Figure 3:
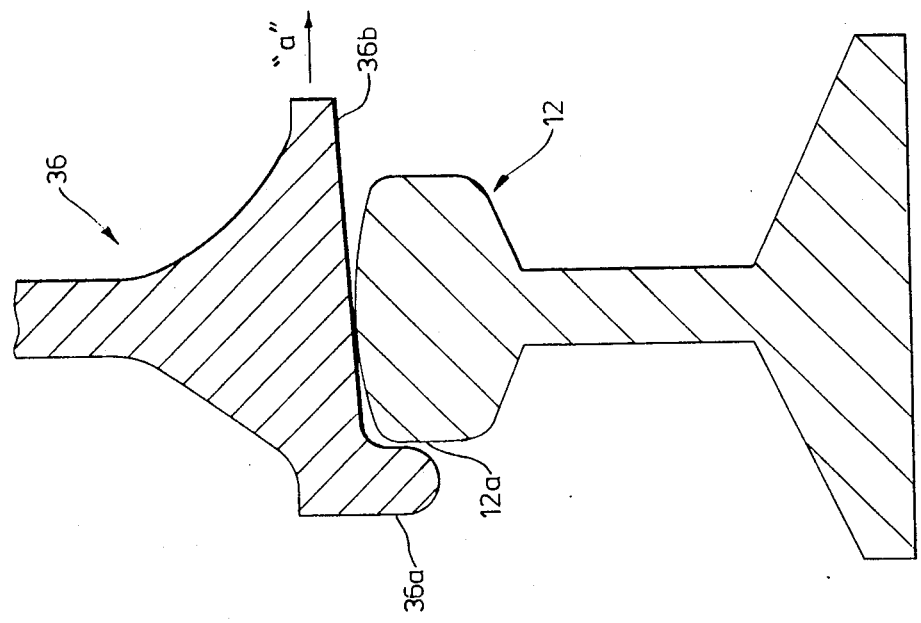
FIG. 3 is a cross-sectional view taken on line 3—3 of FIG. 1.

The profile of the train wheels, for example wheel 36, is better illustrated in FIG. 3, and includes a flange portion $36a$ and a frustro conical portion $36b$. The flange portion $36a$ provides a limit of outward transverse movement of the wheel 36, in the direction of arrow "a" on the rail 12. The conical portion $36b$ on the other hand enables the wheel to travel laterally on the rail up to the limit defined by the flange portion $36a$, at which point the flange portion $36a$ engages the inner side $12a$ of the rail 12. This movement of the wheels on the rails is continuous and takes into account elevational and directional variations of the bus 10 along the track.

It has been found that providing a slight rotation of one axle with respect to the other substantially reduces the "hunting" of the bus.

As illustrated in FIG. 2, the front axle 26 is rotated about a point "r" on the left front spring 42 by an angle o, with optimum results being found in a range of o from about 0°5' to about 0°30'. Rotation of the axle is provided by adjusting the connection points of the springs 42 on the substructure 18.

Such a rotation causes the tangential axis of the wheel 36 to converge upon the axis of the rail at a point forward of the contact point between the wheel and the rail.

Numerous advantages are seen in offsetting the front wheels 34, 36. Firstly, such an offset causes the wheels to have a slight right hand steer, resulting in the right hand wheel 36 travelling toward its outer limit where the flange portion $36a$ contacts the inner side $12a$ of the rail. The slight right hand steer generates an outwardly directed bias on the right hand wheel and an inwardly directed bias on the left hand wheel, thereby causing the normal hunting range to be restricted and resulting in the increased stability of the bus.

Testing has revealed that wear is higher than normal in the right hand wheel 38, particularly in the area of the flange. However, the subsequent reduction in the "hunting" results in a reduced wear being found on the other three wheels.

Various other configurations are also contemplated to achieve a reduction in the "hunting" effect, to reduce wear and improve vehicle stability. Several configurations are shown in FIG. 4, wherein dashed lines indicate vehicle offset and, for the sake of illustration, are shown in an exaggerated scale.

Configuration 1 illustrates the above-mentioned offset of the front axle, which causes a slight right hand rotation of the vehicle with respect to the rails.

Configuration 2 illustrates a slight left hand rotation of the vehicle, caused by the right hand offset of the rear axle.

Configuration 3 illustrates the left hand offset of both the front and rear axles, thereby causing the flange on the left hand front axle wheel to converge on the left rail. However, the left hand rotation of the vehicle is prevented by the left hand offset of the rear axle. Rather than causing a rotation of the vehicle, this causes the vehicle to be slightly shifted to the left hand side of the rail, but with the longitudinal axis of the vehicle lying substantially parallel with the rail. In addition, a relatively higher rate of wear is seen in the flange area of both left hand wheels.

A further alternative is shown by configuration 4 wherein the front axle of the vehicle is split, with the right hand segment being given a right hand offset, while the left hand wheel remains in an in-line orientation with respect to the rail. This configuration also causes a slight right hand rotation of the vehicle. However, the extent of the inherent bias established by the offset is relatively lower than in configuration 1 due mainly to the left hand wheel providing no bias.

Configuration 5 illustrates the offset of respective opposite segments of both the front and rear axles such that the right front and left rear wheels have forwardly convergent flanges. This configuration also causes a slight right hand rotation of the vehicle, which is relatively greater than the rotation in configuration 1.

Also contemplated is the implementation of an automatic offset control mechanism to vary automatically the offset of the axle with respect to the rail, thereby adjusting the angle of convergence between the flange and the rail, depending on variations in elevation and direction. The use of such an automatic mechanism is also considered for both the front and rear axles, and also in the case of the offset of axle segments.

In addition, the axle 26 may be rotated about other points defined in, for example, the central region of the axle 26 or the right hand spring 42b. The connection points of the axle 26 to the springs 42a, 42b may also be adjusted to achieve axle rotation.

We claim:

1. A vehicle having a longitudinal axis and arranged to travel along a track formed from a pair of rails extending in the direction of the longitudinal axis, each of the rails having a wheel contacting surface disposed on opposite sides of and parallel to a central track axis, comprising a pair of wheel sets each having a pair of frusto conical wheels disposed on opposite sides of the longitudinal axis, and wheel mounting means for mounting each of said wheels for independent rotation about a respective axis of rotation, means for maintaining at least one of said wheel mounting means of at least one of said wheel sets in a position wherein said axis of rotation is disposed at an angle other than 90 degrees to said longitudinal axis, in order to cause an incremental offset of said longitudinal axis relative to said central axis as the vehicle travels along said track and thereby improve the stability of the vehicle.

2. A rail vehicle as defined in claim 1, wherein each of said pairs of wheel mount means is supported by an axle, and said predetermined angle is defined by a rotation.

3. A rail vehicle as defined in claim 2 wherein the predetermined angle ranges from about 0 degrees, 5 minutes to about 0 degrees, 30 minutes.

4. A rail vehicle as defined in claim 2, wherein said predetermined angle is provided at a front wheel.

5. A rail vehicle as defined in claim 2 further comprising suspension means to suspend said vehicle body on said drive assembly, said suspension means defining a point of rotation of said portion of the axle.

6. A rail vehicle as defined in claim 5 wherein the whole of said axle is rotated.

7. A method of adapting a road vehicle having a longitudinal axis to travel along a track having a pair of rails extending in the direction of the longitudinal axis and each having a wheel contacting surface disposed on opposite sides of and parallel to a central track axis, said vehicle having a pair of wheel sets, each including a pair of wheel mounts, said wheel mounts being capable of independent rotation and disposed on opposite sides of the longitudinal vehicle axis, comprising the steps of:
mounting a frusto conical flanges wheel on each of said wheel mounts for rotation about a respective axis of rotation;
maintaining at least one of said wheel mounts of at least one of said wheel sets in a position so that the axis of rotation is at an angle other than 90 degrees to the said longitudinal axis, to cause an incremental offset of said longitudinal axis relative to said central axis as the vehicle travels along the track and thereby improve the stability of the vehicle.

8. A method as defined in claim 7 wherein a pair of wheel mounts are supported by an axle and the step of maintaining one of the wheel mounts involves rotating at least a portion of said axle by a predetermined incremental angle about an axis perpendicular to said axle.

9. A method as defined in claim 8, wherein the predetermined angle ranges from 0 degrees, 5 minutes to about 0 degrees, 30 minutes.

* * * * *